US00RE42947E

(19) United States
(12) Reissued Patent
Chen et al.

(10) Patent Number: US RE42,947 E
(45) Date of Reissued Patent: Nov. 22, 2011

(54) CIRCUITS, SYSTEMS, METHODS, AND SOFTWARE FOR POWER FACTOR CORRECTION AND/OR CONTROL

(75) Inventors: Xiaopeng Chen, Sunnyvale, CA (US); Jianqing Lin, Pleasanton, CA (US); Hubertus Notohamiprodjo, Union City, CA (US)

(73) Assignee: Marvell International Ltd., Hamilton (BM)

(21) Appl. No.: 12/813,470

(22) Filed: Jun. 10, 2010

Related U.S. Patent Documents

Reissue of:
(64) Patent No.: 7,511,460
Issued: Mar. 31, 2009
Appl. No.: 11/977,869
Filed: Oct. 26, 2007

U.S. Applications:
(63) Continuation of application No. 10/949,624, filed on Sep. 24, 2004, now Pat. No. 7,292,013.

(51) Int. Cl.
*G05F 1/613* (2006.01)
*G05F 1/70* (2006.01)

(52) U.S. Cl. ..... 323/222; 323/299; 363/89

(58) Field of Classification Search ..... 323/222, 323/223, 282, 284, 285, 299, 300, 351, 205, 323/207; 363/89, 125, 127
See application file for complete search history.

(56) References Cited

U.S. PATENT DOCUMENTS 4,688,162 A * 8/1987 Mutoh et al. ..... 363/80
4,761,725 A * 8/1988 Henze ..... 363/46
5,349,284 A * 9/1994 Whittle ..... 323/207
5,430,364 A * 7/1995 Gibson ..... 323/207
5,479,336 A * 12/1995 Motoki et al. ..... 363/89
5,638,265 A 6/1997 Gabor
5,793,624 A 8/1998 Couture et al.
6,043,633 A 3/2000 Lev et al.
6,448,745 B1 9/2002 Killat
6,753,798 B2 6/2004 Feldtkeller
6,906,503 B2 6/2005 Lopez-Santillana et al.
6,944,034 B1 9/2005 Shteynberg et al.
6,946,819 B2 9/2005 Fagnani et al.
7,266,001 B1 * 9/2007 Notohamiprodjo et al. .... 363/59
7,279,876 B2 * 10/2007 Adragna et al. ..... 323/284
7,292,013 B1 * 11/2007 Chen et al. ..... 323/222

OTHER PUBLICATIONS

Ashok Bindra; Power Supply Contoller Keeps Efficiency High Across all Loads; Electronic Design; Dec. 3, 2001; Cover Story; 3 Pgs.; Penton Publication Media Inc.
Technology (pulseTrain); Technology; 2003 iWatt Inc.; Digital Revolution in Power Conversion; www.iwatt.com/technology/... .
Hubertus Notohamiprodjo et al; Method and Apparatus for Controlling Power Factor Correction; U.S. Appl. No. 10/804,660, filed Mar. 19, 2004.

* cited by examiner

*Primary Examiner* — Gary L Laxton

(57) ABSTRACT

Circuits, systems, methods and software for controlling a power conversion and/or correcting and/or controlling a power factor in such conversion(s). The present invention generally takes a computational approach to reducing or minimizing zero current periods in the critical mode of power converter operation, and advantageously reduces zero current periods in the critical mode of power converter operation, thereby maximizing the power factor of the power converter in the critical mode and reducing noise that may be injected back into AC power lines. The present power factor controller allows for greater design flexibility, reduced design complexity, and reduced resolution and greater tolerance for error in certain parameter measurements useful in power factor correction and/or control.

24 Claims, 7 Drawing Sheets

(Background Art)

(Background Art)

(Background Art)

CIRCUITS, SYSTEMS, METHODS, AND SOFTWARE FOR POWER FACTOR CORRECTION AND/OR CONTROL

Matter enclosed in heavy brackets [ ] appears in the original patent but forms no part of this reissue specification; matter printed in italics indicates the additions made by reissue.

RELATED APPLICATIONS

This application is a continuation of U.S. application Ser. No. 10/949,624, filed Sep. 24, 2004, incorporated herein by reference in its entirety. This application may also be related to U.S. application Ser. No. 10/804,660, filed Mar. 19, 2004, the relevant portions of which are incorporated herein by reference.

FIELD OF THE INVENTION

The present invention generally relates to the field of power factor correction and/or control. More specifically, embodiments of the present invention pertain to circuits, systems, methods, and software for correcting and/or controlling a power factor in alternating current (AC)-direct current (DC) conversions.

DISCUSSION OF THE BACKGROUND

An electrical load may appear to a power supply as a resistive impedance, an inductive impedance, a capacitive impedance, or a combination thereof. Ideally, when the current passing to the load is in phase with the voltage applied to or crossing the load, the power factor approaches one. Due to the nature of alternating current, the power factor of AC power can easily be less than one in certain situations (e.g., when the voltage is close to zero). In such situations, transmitted power/energy can be wasted (due to phase mismatch between current and voltage) and/or noise may be introduced into the power line. To reduce the noise to the power line caused by electrical loads and to improve the efficiency of power transmission, power supplies generally have power factor correction (PFC) circuitry to shape the input current waveform to follow the input voltage waveform. The closer the phase of the input current waveform follows the phase of the input voltage waveform, the more efficient the power conversion and the less noise is returned to the AC power line. The power factor, or PF, is a measure of this power conversion efficiency, and ideally, the PF for a given power converter should approach 1 under all conditions. When the PF does not approach 1, even under limited conditions, some portion of the transmitted energy is wasted, and current that should be passed onto a load may be returned, thereby introducing noise onto the power line.

FIG. 1 is a diagram of a conventional boost converter 10, in which an alternating current power supply AC is received at four-way rectifier 15. Input current $I_{in}$ passes through inductor 20, and under certain operational conditions, a part of input current $I_{in}$ passes through diode 50 (having a capacitor/filter 60 at its output) before being applied to load 70. Power factor controller 30 effectively controls the current flowing through inductor 20 by turning switch 40 on and off in response to an AC voltage-sensing input 12, a DC output voltage 72, a sensed power conversion current from a current detection inductor 25, and a feedback current 34. When switch 40 is on, a current 22 generally flows through inductor 20 (thereby storing some energy in inductor 20), then through switch 40 to ground. When switch 40 is off, a current 52 may flow through diode 50 and some charge may collect at capacitor 60, but generally, current flow 22 through inductor 20 is significantly reduced or even prevented.

FIG. 2 is a graph showing an AC voltage V into AC-DC converter 10. Input voltage V is the rectified half-sine wave of the AC waveform input. However, due to the on/off cycles of switch 40 (controlled by controller 30; see FIG. 1), the current waveform I in FIG. 2 has a sawtooth pattern. After passing such a sawtooth waveform I through a low-pass filter (e.g., high frequency bypass capacitor 17 in FIG. 1), the input current waveform resembles the input voltage AC at the input of rectifier 15, and the PF for the conversion approaches 1 under most conditions, particularly those conditions where the loading power is sufficiently high to allow an appreciable average input current to continuously pass through inductor 20. This is, in fact, known as the "average current mode" or "continuous mode" of operation for boost power converter 10.

The PFC for a given boost converter generally has two parameters defined by a specification: (1) PF, and (2) total harmonic distortion (or THD). THD refers to distortion caused generally by higher order harmonics (e.g., for a 60 Hz AC signal, distortion in the converted power signal caused by AC signals having a frequency of 120 Hz, 180 Hz, or other n*60 Hz value, where n is an integer of 2 or more). Generally, the higher the THD, the lower the efficiency. Such harmonics can saturate the transformer coils in boost converter 10 (e.g., in inductor 20). Moreover, if the THD is sufficiently high, noise can be fed back onto the AC power lines 12-14, a highly undesirable result from the perspective of a systems designer (e.g., of a power line network).

FIG. 3A shows a low-power and/or low-voltage portion 120 of the voltage and current waveforms of FIG. 2. The voltage waveform V is the voltage at the output of rectifier 15 (see FIG. 1), and the current waveform I is the input current $I_{in}$ passing through inductor 20. When switch 40 in FIG. 1 is turned on at time $t_0$, current I increases in a substantially linear manner, as shown by slope 122. Switch 40 is on for a period of time determined by controller 30, and at the end of this time (point 124 on the current waveform I in FIG. 2), switch 40 turns off and current I decreases in a substantially linear manner. Switch 40 then is turned on again by controller 30 (see FIG. 1) after a period of time $t_s-t_0$, also determined by controller 30.

When current I=0 (i.e., $I_0$, the current value during "zero current period" 126 in FIG. 3A), the average current or continuous mode of operation has a potential distortion issue. The THD, no matter how low, cannot be controlled during the zero current period 126 of waveform portion 120 because there is no current flowing through inductor 20 of FIG. 1. This lack of THD control can have a dramatic effect on the THD specification number. The discontinuous mode of operation of boost power converter 10 occurs during those periods of time where switch 40 is turned on and off for lengths of time sufficient for zero current periods to appear, and the critical mode of operation occurs when current waveform I (see FIG. 3A) is at or near zero ($I_0$). Those skilled in the art generally wish to maximize the amount of time that the inductor current $I_{in}$ is above zero (see FIG. 1) and minimize the zero current periods (e.g., zero current period 126 of FIG. 3A).

As a result, the need in the art to turn switch 40 on as soon as possible when current I=0 has been long felt. Referring now to FIG. 3B, ideally, $t_s$ would be at the point in time when current I crosses $I_0$ (the "I=0" axis), zero current period 126 would have a length as close to 0 units of time as possible, switch 40 (see FIG. 1) would be turned on essentially immediately by controller 30 (see FIG. 1) after current waveform portion 134 intersects $I_0$ (see FIG. 3B), thereby causing current waveform portion 136 to increase essentially immediately after current waveform portion 134 intersects $I_0$ and enabling current to flow through inductor 20 (see FIG. 1) substantially continuously. One generally avoids turning switch 40 on too soon (i.e., before current waveform portion 134 in FIG. 3B intersects $I_0$), in order to avoid causing the average input current from increasing at too high a rate, which could cause the input current waveform phase to move out of alignment with the input voltage waveform phase.

There have been several approaches attempting to achieve results as close as possible to the ideal results shown in FIG. 3B. One such approach involves trying to detect directly the input current $I_{in}$ flowing through inductor 20 (see FIG. 1). One widely used technique employs a second inductor coil 25 to sense the current $I_{in}$ flowing through inductor 20 in a manner similar to the function of a transformer. However, this approach suffers from the inevitable latency that all transformer coils experience when sensing a current in another coil, necessarily introducing some positive length of time in the zero current period 126 (see FIG. 3A) and introducing some noise back into the AC power line 12-14. Also, the second inductor coil 25 adds some expense to manufacturing controller 30 and necessitates at least one dedicated differential pin on controller 30 to receive information from second inductor coil 25.

Alternatively, one could try to sense the current at node 34 in FIG. 1. However, the current and voltage values at node 34 are relatively low in the critical mode of operation, thereby increasing the relative error in current determinations at node 34 to a level where such determinations may not be sufficiently accurate for commercially successful applications. Also, determining the current at node 34 would require controller 30 to have a relatively high sampling rate (i.e., >>1 sample taken every $1/[t_s-t_0]$ seconds) in the critical mode, and the sampling resolution should be relatively high to avoid turning switch 40 on too fast or too slow.

SUMMARY OF THE INVENTION

Embodiments of the present invention relate to circuitry, architectures, systems, methods, algorithms and software for correcting and/or controlling a power factor, for example in AC-DC boost converters. The circuitry generally comprises a power factor controller, comprising (a) a circuit configured to determine and/or identify (i) a period of a periodic power signal and (ii) a length of time from a beginning of the period during which a potential is applied to a power conversion switch; (b) a voltage calculator configured to determine at least a peak voltage of the periodic power signal; and (c) logic configured to calculate a time period to open the switch in response to (i) the length of time, (ii) the power signal period, and (iii) the peak voltage. The systems generally comprise the present controller and a switch that it controls, although one aspect of the system relates to a power converter comprising such a system and an inductor configured to store energy from a periodic power signal, such as an AC power signal.

The method generally comprises the steps of (1) storing energy from a periodic power signal in a power converter in response to application of a potential to switch in electrical communication with the power converter; (2) calculating a time period to open the switch from (i) an initial length of time during which a potential is applied to the switch, (ii) a period of the periodic power signal, and (iii) a peak voltage of the periodic power signal; and (3) opening the switch during the time period. The software generally comprises a set of instructions adapted to carry out the present method.

The present invention generally takes a computational approach to reducing and/or minimizing zero current periods in the critical mode of power converter operation, and advantageously reduces zero current periods in the critical mode to a reasonable and/or tolerable minimum, thereby minimizing the THD of the power converter in the critical mode and reducing noise that may be injected back into AC power lines.

These and other advantages of the present invention will become readily apparent from the detailed description of preferred embodiments below.

DETAILED DESCRIPTION OF THE PREFERRED EMBODIMENTS

Figure 1:
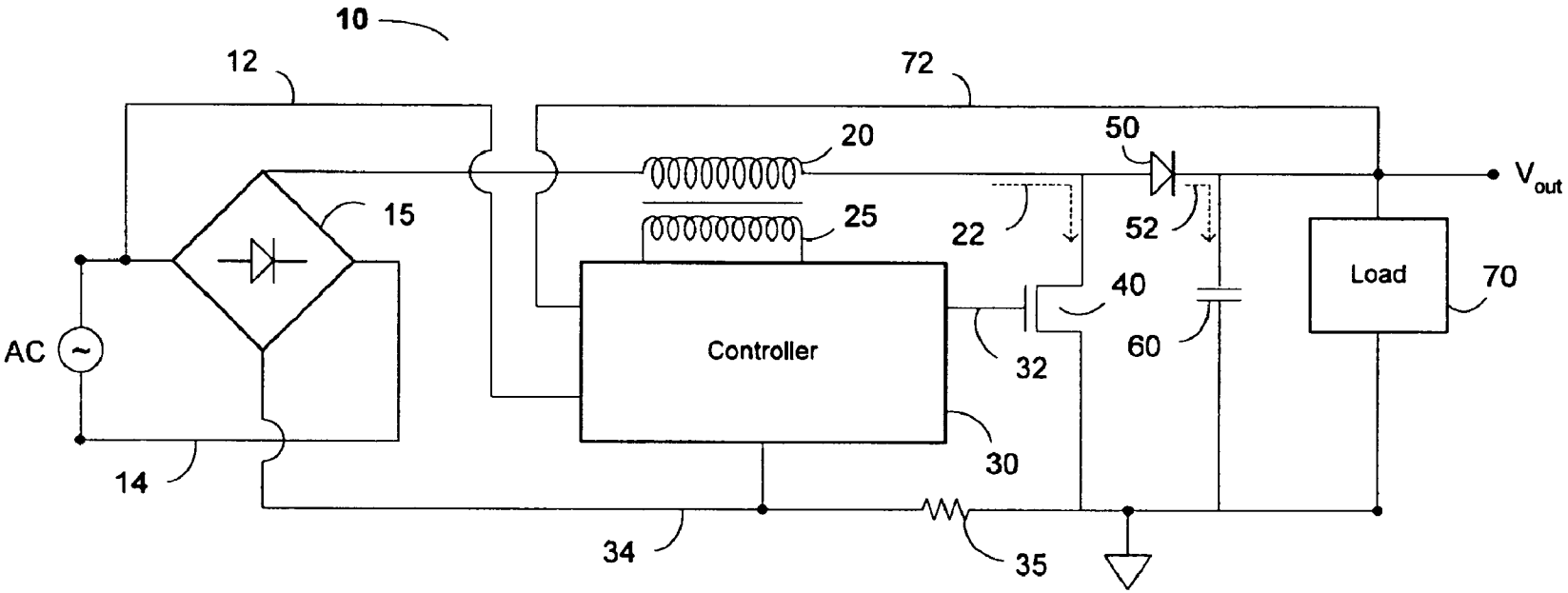
FIG. 1 is a diagram showing a conventional boost converter.
Figure 2:
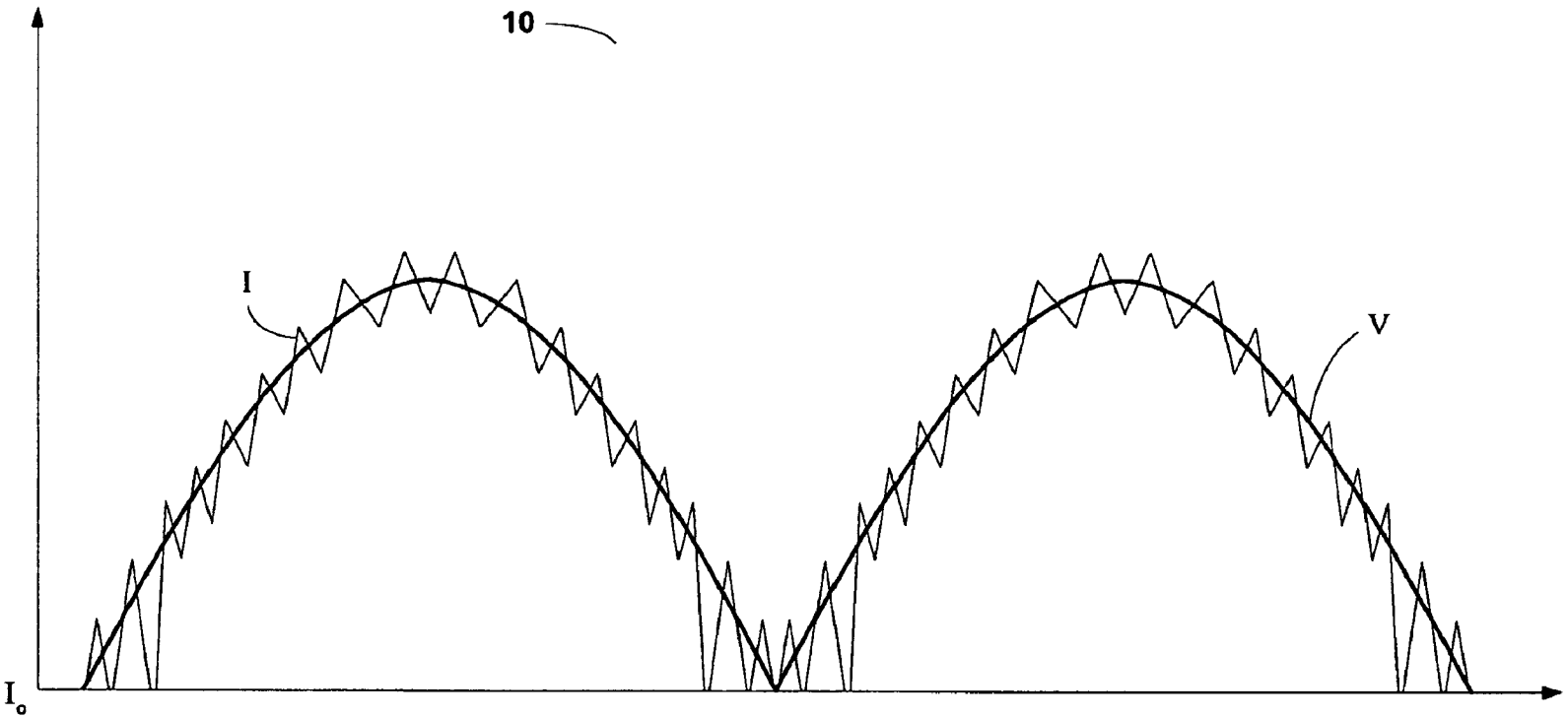
FIG. 2 is a graph depicting voltage and current waveforms at particular nodes in the conventional boost converter of FIG. 1.
Figure 3B:
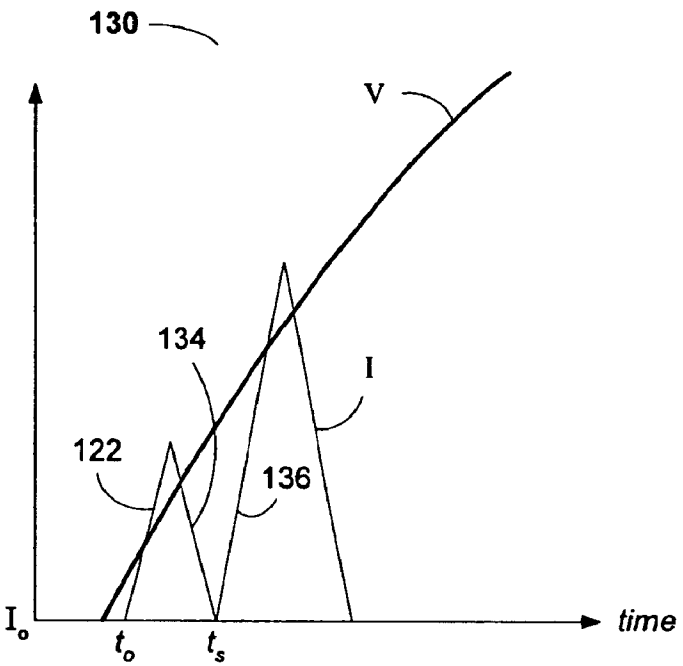
FIGS. 3A-3B are graphs depicting a low-voltage and low-current portion of the waveforms of FIG. 2.
Figure 3A:
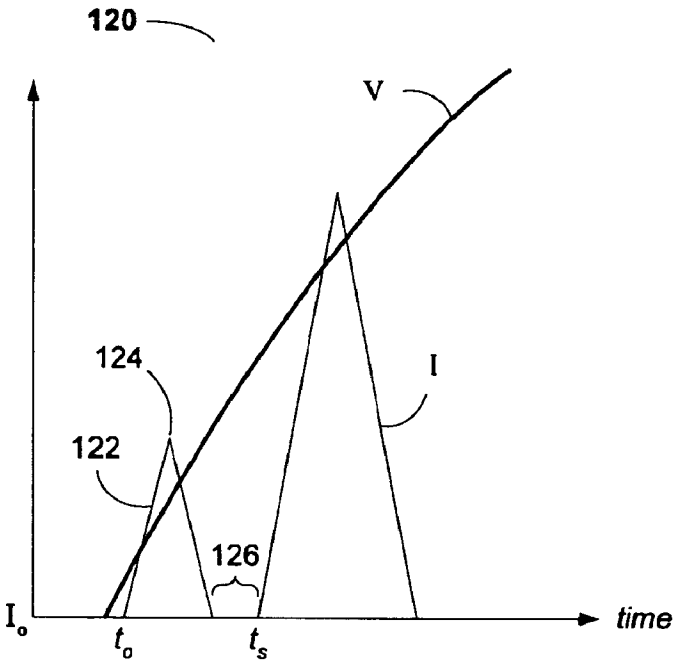

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "data," "data stream," "waveform," and "information" are generally used interchangeably herein, but are generally given their art-recognized meanings. Also, for convenience and simplicity, the terms "connected to," "coupled with," "coupled to" and "in communication with" may be used interchangeably (which terms may also refer to direct and/or indirect relationships between the connected, coupled and/or communication elements unless the context of the term's use unambiguously indicates otherwise), but these terms are also generally given their art-recognized meanings.

The present invention concerns a circuit, system, method, and software for power factor correction and/or control. The present invention generally takes a computational approach to reducing and/or minimizing zero current periods in the critical mode of boost converter operation. One inventive circuit is a power factor controller, comprising (a) a circuit configured to determine and/or identify (i) a period of a periodic power signal and (ii) a length of time from a beginning of the period during which a potential is applied to a power conversion switch; (b) a voltage calculator configured to determine at least a peak voltage of the periodic power signal; and (c) logic configured to calculate a time period to open the switch in response to (i) the length of time, (ii) the power signal period, and (iii) the peak voltage. The system generally comprises the present controller and a switch that it controls, although a further aspect of the system relates to a power converter comprising such a system and an inductor or other means for storing energy from a periodic power signal, such as an AC power signal.

A further aspect of the invention concerns a method of correcting and/or controlling a power factor and/or controlling a power conversion. The method generally comprises (1) storing energy from a periodic power signal in a power converter in response to application of a potential to switch in electrical communication with the power converter; (2) calculating a time period to open the switch from (i) an initial length of time during which a potential is applied to the switch, (ii) a period of the periodic power signal, and (iii) a peak voltage of the periodic power signal; and (3) opening the switch during the time period. The software comprises a processor-readable or -executable set of instructions generally configured to implement the present method and/or any process or sequence of steps embodying the inventive concepts described herein.

The invention, in its various aspects, will be explained in greater detail below with regard to exemplary embodiments.

An Exemplar Boost Converter

In one aspect, the present invention relates to a power converter, comprising the present power factor controller (described in greater detail below), an inductor configured to store energy from a periodic power signal, and a power conversion switch configured to charge the inductor when a potential is applied to the switch. Generally, the switch is controlled by the present power factor controller, and the periodic power signal is either an alternating current (AC) power signal or a rectified AC power signal. In one implementation, the power converter is an AC-DC boost converter.

In various embodiments, the power converter may further comprise a diode configured to receive an output from the inductor and provide an output voltage to a load; a ripple filter coupled to an output of the diode; and/or a rectifier configured to rectify an alternating current power signal. In one embodiment, the periodic power signal comprises an output of the rectifier (e.g., it is a rectified AC power signal).

In other embodiments, the inductor converts the periodic power signal (e.g., the AC signal) into a substantially constant power signal (e.g., a DC signal); and/or the switch may be configured to (i) provide a power conversion current to the inductor when a potential is applied to it (e.g., when it is closed) and/or (ii) reduce, eliminate or prevent a power conversion current from passing through the inductor when the switch is open.

Figure 4:
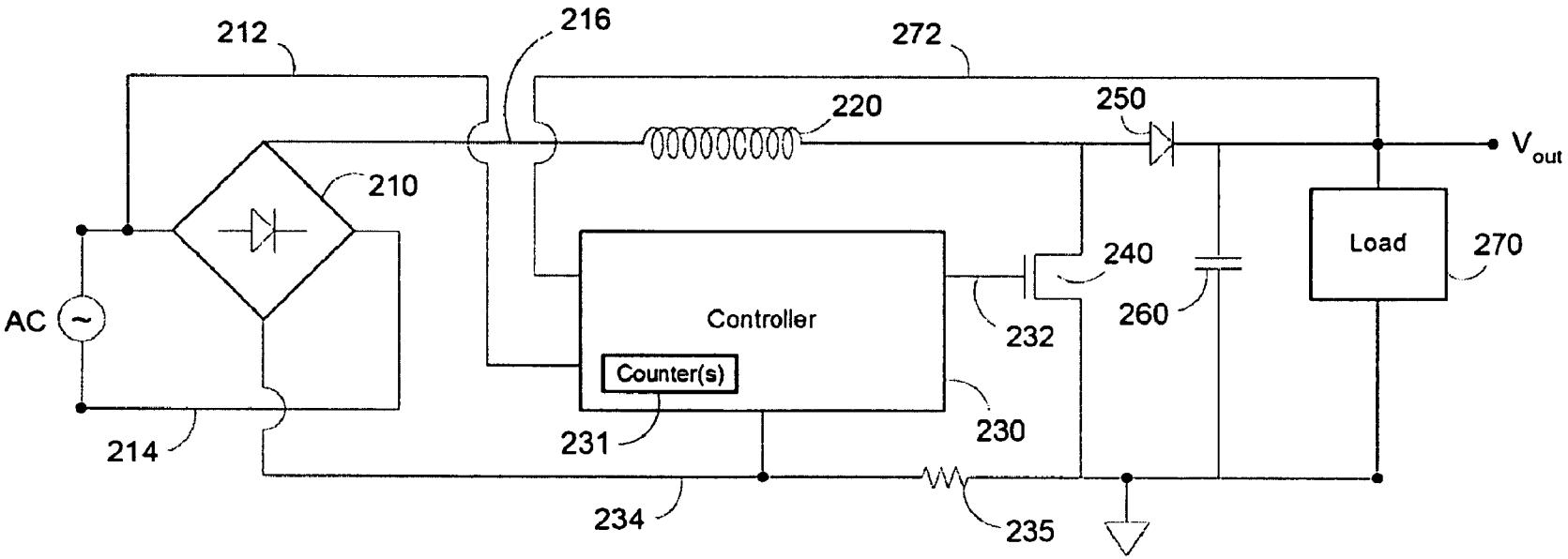
FIG. 4 is a diagram of an exemplary boost converter according to the present invention.

The operation of the present power factor controller and power converter may be best explained with reference to an exemplary embodiment. FIG. 4 shows a first exemplary embodiment of a boost converter 200, including four-way rectifier 210 receiving alternating current power supply AC from power lines 212 and 214, inductor 220, exemplary power factor controller 230, and switch 240. Boost converter 200 may further include current feedback resistor 235, diode 250, and capacitor/filter 260, the input node 272 to which may also be in communication with load 270. Similarly to the conventional power factor controller 30 of FIG. 1, power factor controller 230 of FIG. 4 effectively controls the current flowing through inductor 220 by turning switch 240 on and off in response to AC voltage-sensing input 212, DC output voltage 272, and feedback current 234. However, the present power factor controller 230 computes the length of time that switch 240 remains off in order to reduce or minimize zero current periods, and does not require a second inductor to sense when the input current through inductor 220 is zero.

For example, in FIG. 4, when switch 240 is on, a current generally flows through inductor 220 thereby storing some energy in inductor 220. When switch 240 is off, current may flow through diode 250 and some charge may collect in capacitor 260, but generally, current flow through inductor 220 is significantly reduced or prevented). Diode 250 is thus configured to (i) receive an output from inductor 220 and (ii) pass current unidirectionally from the inductor output to a substantially constant output voltage (generally applied to a load 270).

One object of the invention is to compute or calculate the length of time that switch 240 is off ("$t_{off}$") that results in a zero current through inductor 220. If one can compute or calculate ("$t_{off}$"), then one can determine when to turn switch 240 back on in a manner minimizing the zero current period. The invention focuses on a power factor controller configured to conduct such calculations.

Figure 5:
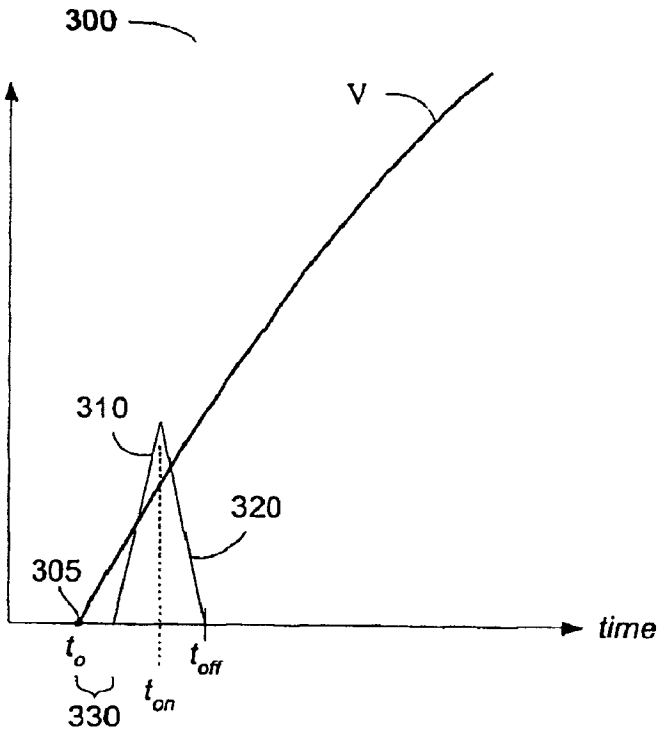

FIG. 5 shows current and voltage waveforms for the exemplary boost converter 200 of FIG. 4 in a critical current mode of operation. Switch 240 is turned on at time $t_0$, causing the current I flow through inductor 220 to increase at a substantially linear rate (e.g., see current waveform section 310 in FIG. 5). Switch 240 remains on for a predetermined length of time $t_{on}$, where the predetermined length of time may be programmed into a memory unit in controller 230 (see FIG. 4) or may be calculated, computed or determined conventionally by controller 230 in response to one or more conventional inputs (e.g., a current or voltage input from AC power line 212, a power conversion feedback from output voltage $V_{out}$ node 272 and/or feedback current node 234, etc.). After time $t_{on}$, controller 230 turns switch 240 off, and current waveform I decreases at a substantially linear rate until current I=0 (e.g., see current waveform section 320 in FIG. 5). The length of time that switch 240 is off for current I to reach 0, $t_{off}$, can be computed or calculated using relatively simple triangulation techniques from a number of known parameters, including $t_{on}$, the AC input voltage and the peak AC input voltage $V_p$ on power line 212, and the output voltage $V_{out}$ at node 272. It is well within the abilities of one skilled in the art to design and use logic configured to compute or calculate $t_{off}$ from these known parameters, as will be apparent to those skilled in the art from the following discussion.

The triangulation approach to determining $t_{off}$ is relatively straight-forward. Referring to FIG. 5, the slope of increasing current waveform section 310 is simply the voltage $V_{in}$ at node 216 divided by the inductance L of inductor 220. Similarly, the slope of decreasing current waveform section 320 is simply the $V_{out}$ (node 272) minus $V_{in}$ (node 216), divided by L. Current waveform sections 310 and 320 each form the hypotenuse of two right triangles, the abscissa of which is the current $I_{in}$ through inductor 120 at time $t_{on}$, and the respective ordinates of which are $t_{on}$ and $t_{off}$. From these relationships, we can calculate $t_{off}$. Mathematically, $$\text{Slope}(310)=V_{in}/L \quad [1]$$

$$\text{Slope}(320)=(V_{out}-V_{in})/L \quad [2]$$

$$t_{off}=t_{on}*V_{in}/(V_{out}-V_{in}) \quad [3]$$

The output voltage $V_{out}$ is generally predetermined and/or known by design; e.g., it has a specified, substantially constant value (for example, 450 V), although there will be some minor fluctuations in the actual value due to small ripples, the source(s) of which are known to those skilled in the art, but which as a percentage of $V_{out}$ are insignificant and/or negligible. Thus, for purposes of computing $t_{off}$, $V_{out}$ is generally considered to be a constant value. Nonetheless, in one embodiment, $V_{out}$ is determined (e.g., measured or sampled) every n on/off cycles of switch 240, where n is an integer, and the $V_{out}$ value may be stored and/or updated in controller 230 as needed or desired for computing $t_{off}$. At the values of $V_{out}$ expected to be observed in certain applications of the present invention, $V_{out}$ can be measured relatively accurately with relatively low resolution (at least in comparison with typical values of $I_{in}$ and/or $V_{in}$ to be detected in the critical mode at inductor 220 or node 234).

Also, as discussed above, $t_{on}$ is a known and/or predetermined value for purposes of computing $t_{off}$. However, the voltage $V_{in}$ at node 216 is not necessarily a known, predetermined or fixed value at a given point in time during the critical mode of converter operation. $V_{in}$ can be calculated using known, (pre)determined, fixed or reliably measurable and/or detectable parameter values, though.

The rectified voltage at node 216 is still a half-sine wave, subject to standard trigonometric relationships with other parameters. Thus, if one knows the peak voltage $V_p$ at node 216 and the period of the half-sine wave, one can calculate the value of $V_{in}$. Mathematically, $$V_{in}=V_p*\sin(\pi t/T) \quad [4]$$

where $t=t_{on}$ plus the time 330 from $t_0$ to $t_{on}$, and T is the period of the rectified voltage half-sine wave (e.g., for a 60 Hz AC power signal, the period T is 1/(2*60 Hz)=8.3 msec). In one embodiment, controller 230 includes one or more counters 231 configured to (i) count the length and/or indicate the end of period T, and/or (ii) determine the length of time t (e.g., initiating a count of known time increments in response to an "end of period T" indication and ending the count at the end of $t_{on}$, when switch 240 is turned off).

Figure 6:
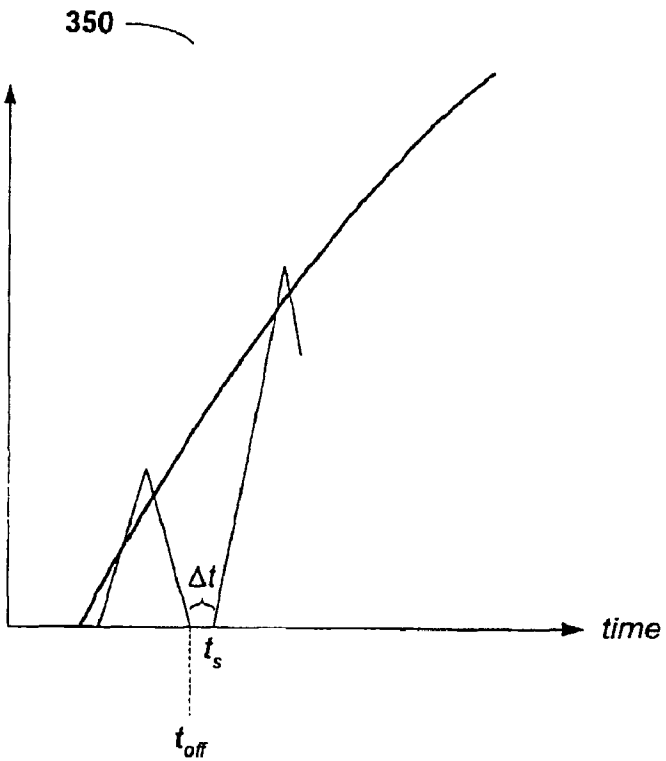
FIGS. 5-6 are graphs of low-voltage and low-current waveforms useful for explaining the operation of the exemplary boost converter of FIG. 4.

As described above, it is generally not desirable to turn switch 240 on too soon in the critical mode. However, it is possible to do so when $V_{out}$ fluctuates (e.g., due to small ripples) and/or when one underdetermines the value of t. As a result, and now referring to FIG. 6, one may add a small amount of time Δt to $t_{off}$ to provide a kind of buffer against turning on switch 240 too soon. Thus, $t_s$, the time at which switch 240 turns on for a second time in the critical mode, may equal $t_{on}+t_{off}+\Delta t$. Alternatively, from the viewpoint of controller 230 (see FIG. 4), where $t_{off}$ is the actual length of time that switch 240 is off in a given on/off cycle, $$t_{off}=[t_{on}*V_{in}/(V_{out}-V_{in})]+\Delta t \quad [5]$$

Figure 7:
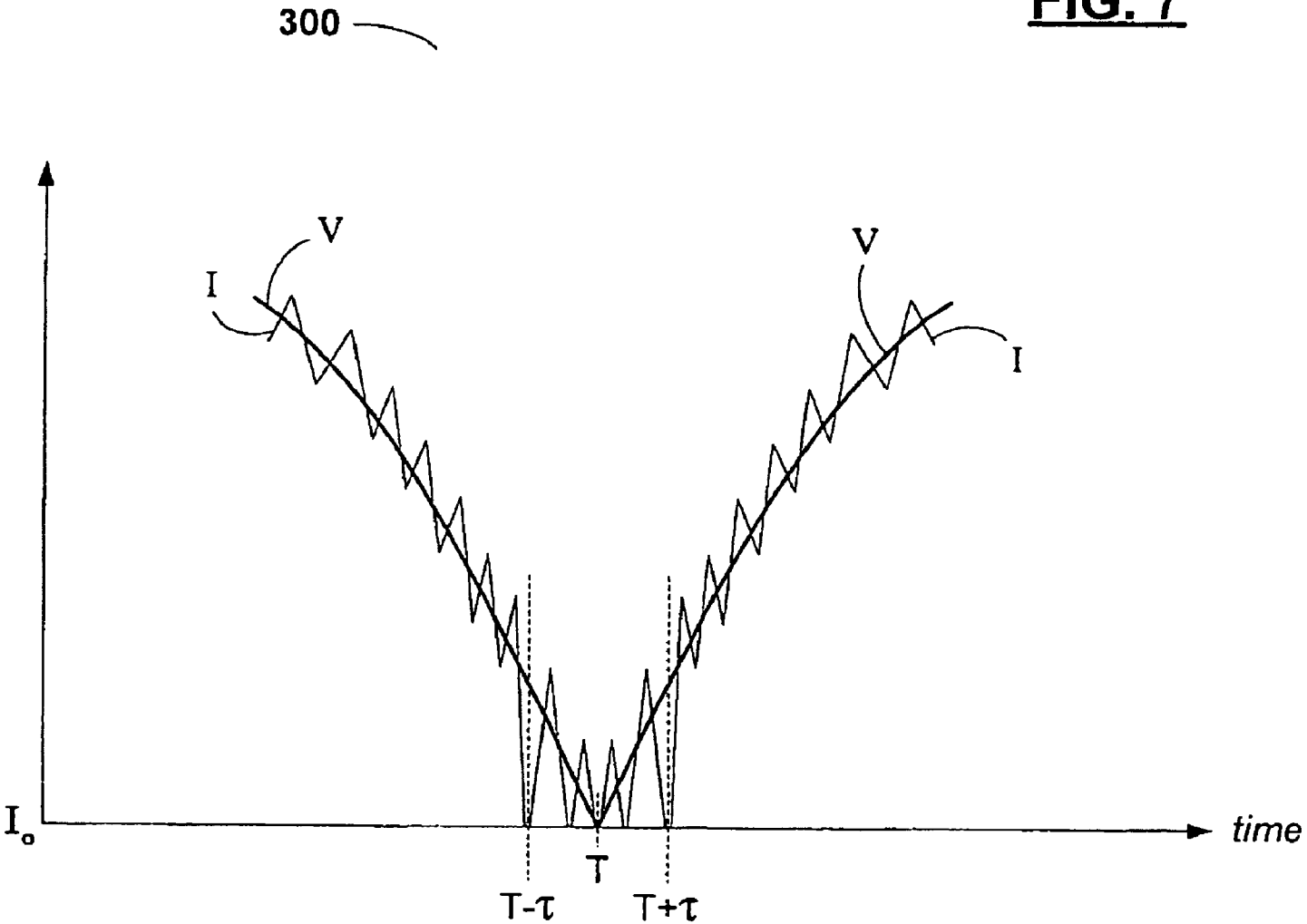
FIG. 7 is a graph depicting voltage and current waveforms for both decreasing and increasing values of the voltage half-sine wave useful for explaining the operation of the exemplary boost converter of FIG. 4.

In one embodiment, the transitions between the average current and critical modes of operation can be determined mathematically. Referring now to the graph in FIG. 7, two transition periods are shown, one on each side of the end of voltage half-sine wave period T. The period of time τ shown in FIG. 7 is effectively the half-period of time in which boost converter 200 is in the critical mode. The critical mode time is effectively 2*τ because the voltage half-sine wave and the current waveform I is symmetric about the time=T axis. Outside of the time from (T−τ) to (T+τ), boost converter 200 is in the average current mode.

When boost converter 200 is in the critical mode, the current waveform I intersects the $I_0$ axis. As a result, $t_s$ (which in this embodiment is the time of the on/off cycle of switch 240; please see FIG. 4) is necessarily longer than $t_{on}+t_{off}$ (where $t_{off}$ is the time that it takes current waveform I to reach $I_0$ when switch 240 is off). Mathematically, referring back to FIG. 6, when $(t_{on}+t_{off})<t_s$, then boost converter 200 is in the critical mode. Conversely, when $(t_{on}+t_{off})>t_s$, then boost converter 200 is in the average current mode.

An Exemplary Power Factor Controller

A central aspect of the invention relates to a power factor controller, comprising (a) a circuit configured to identify (i) a period of a periodic power signal and (ii) a length of time from a beginning of the period during which a potential is applied to a power conversion switch (e.g., $t_{on}$); (b) a voltage calculator configured to determine at least a peak voltage of the periodic power signal; and (c) logic configured to calculate a time period to open the switch in response to (i) the length of time, (ii) the power signal period, and (iii) the peak voltage. Thus, the present power factor controller identifies (i) the power signal period and (ii) the time length that the power conversion switch charges the power converter, determines the peak voltage of the periodic power signal, and calculates a time period during which the power conversion switch is turned off in response to (1) the "on" time of the switch, (2) the power signal period, and (3) the peak voltage. In the context of the present power factor controller, the term "identify" may refer to receiving and/or providing a predetermined value for the power signal period and/or the time length $t_{on}$, calculating or computing such values from one or more other parameter values, or determining such values using conventional techniques for doing so (e.g., counting time increments of predetermined or known length, from a known initiation or starting point to a known termination or ending point). Typically, the periodic power signal comprises an alternating current power signal or a rectified AC power signal.

In various embodiments, the present power factor controller may further comprise (a) a voltage detector configured to determine a zero voltage at an input to the power converter; (b) one or more counters configured to initiate counting (i) the power signal period and/or (ii) the length of time in response to a signal from the voltage detector indicating the zero voltage; (c) a comparator configured to compare the power signal voltage to a first reference voltage and provide a first relative voltage value to the voltage calculator; (d) a filter configured to reduce or remove harmonic noise from the power converter output (e.g., from an output voltage feedback signal); and/or (e) a filter configured to reduce or remove noise from a current feedback signal.

In other embodiments, the logic comprises a digital signal processor, and/or the logic is further configured to calculate the time period(s) when a power converter comprising the switch is in a critical mode, or apply the potential to the switch for a predetermined period of time when a power converter comprising the switch is in a critical mode. Thus, the present controller may process one or more digital signals (typically a plurality of such signals, as will be explained in greater detail with regard to FIG. 8). As a result, the present controller may further comprise one or more (and typically a plurality) of analog-to-digital (A/D) converters configured to convert an analog signal input into the controller to a multi-bit digital signal to be processed by the controller logic/digital signal processor. As is known in the art, the number of bits in an A/D converter corresponds to its resolution; the greater the number of bits, the higher the resolution (and the greater the chip real estate, processing power needed, and cost of the controller).

Figure 8:
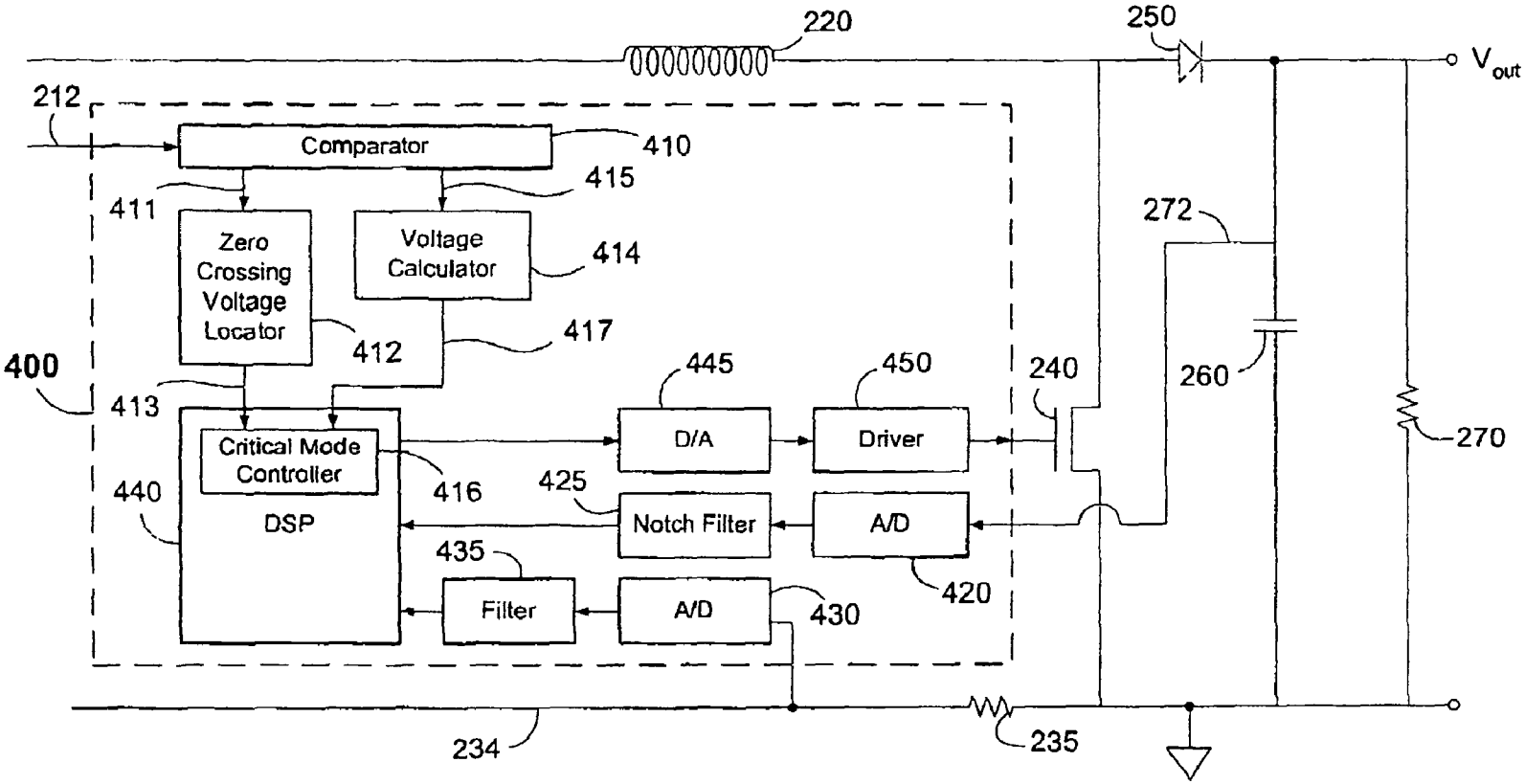
FIG. 8 is a diagram of an exemplary power factor controller according to the present invention.

FIG. 8 shows an exemplary power factor controller 400 according to the present invention. Power factor controller 400 generally comprises comparator 410, zero voltage crossing locator 412, voltage calculator 414, input A/D converters 420 and 430, filters 425 and 435, digital signal processor 440 including critical mode controller 416, output digital-to-analog (D/A) converter 445 and output driver 450, which sends a control signal to open or close power conversion switch 240 (and if to close switch 240, apply a certain potential to switch 240). The invention focuses on critical mode controller 416 and the inputs thereto.

Comparator 410 receives periodic (AC) power signal from AC power line 212. Given the known relationship between the signal from AC power line 212 and the rectified version thereof (e.g., rectified AC power signal 216 in FIG. 4), one skilled in the art can easily perform the calculations described above from AC power line input 212, while avoiding any latency that may be introduced into the power conversion process by rectifier 210. Comparator 410 may comprise a comparator block of two or more comparators, in which first and second individual comparators compare the voltage on AC power line 212 with a first and second reference voltages, respectively, the first and second reference voltages being different from one another.

In one implementation, the first comparator in comparator block 410 compares the voltage on AC power line 212 with a reference voltage having a value of zero volts (0 V), then provides the comparison output 411 to zero voltage crossing locator 412, which transmits appropriate information and/or control signals to critical mode controller 416 in response to the outcome of the comparison. The output 411 from the first comparator may be analog or digital, but the output 413 of zero voltage crossing locator 412 is typically digital. It is well within the abilities of those skilled in the art to design and implement logic capable of such functions. For example, when output 411 is analog, zero voltage crossing locator 412 typically comprises an A/D converter and output 413 is a multi-bit digital signal carrying information about the value of the voltage on AC power line 112 relative to 0 V. However, when output 411 is digital (i.e., the first comparator identifies when the AC voltage 212 is 0 V or not), zero voltage crossing locator 412 typically comprises control logic and output 413 is a single- or multi-bit digital signal configured to instruct various circuits and/or logic in critical mode controller 416 to perform (or stop performing) one or more functions in response to the AC voltage 212 being 0 V.

In another implementation, the second comparator in comparator block 410 is a conventional peak detector configured to determine the maximum voltage on AC power line 212 from cycle to cycle (e.g., either AC power signal cycle or the rectified AC signal half-cycle), then provide an output 415 to voltage calculator 414, which transmits appropriate information and/or control signals to critical mode controller 416 in response to the peak detector output 415. The output 415 from the second comparator may be analog or digital, but the output 417 of voltage calculator 414 is typically digital. It is well within the abilities of those skilled in the art to design and implement logic capable of such functions. For example, when output 415 is analog, voltage calculator 414 typically comprises an A/D converter and output 417 is a multi-bit digital signal carrying information about the value of the peak voltage on AC power line 212. However, when output 415 is digital (i.e., the second comparator compares the AC voltage 212 to a plurality of reference voltages and provides a multi-bit digital output identifying the voltage range that the peak voltage is in), voltage calculator 414 typically comprises control logic and output 417 is a single- or multi-bit digital signal configured to instruct various circuits and/or logic in critical mode controller 416 to adjust, perform or stop performing one or more functions in response to changes in the peak AC voltage on power line 212.

Critical mode controller 416 is configured to compute or calculate at least two things:

- The power signal input voltage (e.g., $V_{in}$) from the peak voltage ($V_p$) and the length of time that switch 240 is on in the critical current mode ($t_{on}$), and
- The time period during which switch 240 is off (e.g., $t_{off}$ above) when the power converter comprising inductor 220 (and/or otherwise in electrical communication with switch 240) is in the critical mode, from $V_{in}$, $V_{out}$ and $t_{on}$.

Thus, critical mode controller 416 is generally configured to calculate $V_{in}$ from the peak AC voltage on power line 212 (provided by input 417 from voltage calculator 414), the half-period of the AC power signal (equivalent to the period of the rectified AC power signal and equal to the time difference between points when the AC voltage 212=0 V, information that is provided by input 413 from zero voltage crossing locator 412), and the time period from when AC voltage 212=0 V to the end of $t_{on}$. As described above, $t_{on}$ is a predetermined length of time that may be programmed into a memory unit in digital signal processor 440 (or elsewhere in controller 400) or that may be calculated, computed or determined conventionally by digital signal processor 440 in response to one or more appropriate inputs (e.g., a current or voltage input from AC power line 212, a power conversion feedback from output voltage $V_{out}$ node 272 and/or feedback current node 234, etc.).

Digital signal processor 440 also receives (1) a filtered, multi-bit digital signal from notch filter 425, corresponding to the power converter output voltage feedback signal 272, and (2) a filtered, multi-bit digital signal from filter 435, corresponding to the current feedback signal 234. These circuit blocks and signals are conventional, and generally perform their conventional function(s). However, one unexpected advantage of the present invention is that the A/D converters 420 and 430 (particularly 430) can have lower resolution than corresponding A/D converters in conventional boost controllers. This is generally because the present computational approach to minimizing $t_{off}$ does not rely on high-resolution information from direct current output $V_{out}$ or current feedback 234 to try to measure accurately those periods where zero current is flowing through inductor 220. Also as described above, one may add a buffer period $\Delta t$ to $t_{off}$, in part to accommodate or allow for small potential accuracy errors in measuring certain parameters, such as $V_p$, $V_{out}$, t, T, and/or (when necessary or desired) $t_{on}$.

Digital signal processor 440 outputs a multi-bit digital signal to D/A converter 445, which converts the multi-bit digital signal to an analog signal instructing output driver 450 to open or close switch 240. If switch 240 is to be closed, the analog signal received by driver 450 informs driver 450 what potential to apply to the gate of switch 240. Alternatively, output driver 450 may comprise a plurality of driver circuits in parallel, each receiving one bit of the multi-bit digital signal output by digital signal processor 440, thereby avoiding a need for D/A converter 445.

Exemplary Methods

The present invention further relates to method of controlling a power converter, comprising the steps of (a) storing energy from a periodic power signal in the power converter in response to application of a potential to switch in electrical communication with the power converter; (b) calculating a time period to open the switch (e.g., $t_{off}$) from (i) an initial length of time during which a potential is applied to the switch (e.g., $t_{on}$), (ii) a period of the periodic power signal (e.g., T), and (iii) a peak voltage of the periodic power signal (e.g., $V_p$); and (c) opening the switch during the time period. As for the descriptions of hardware above, the periodic power signal may comprise an alternating current power signal or a rectified AC power signal, depending on design choices and/or considerations. The energy is typically stored in an inductor when a current from a rectified AC power signal passes through the inductor, and current generally passes through the inductor when the switch is closed. Energy typically is not stored in the boost converter (inductor) when the switch is open.

In various embodiments, the method may further comprise the step(s) of: (1) determining a zero voltage at an input to the power converter; (2) timing, or identifying or determining a time length for, (i) the power signal period and/or (ii) the length of time in response to a zero voltage indication; (3) determining the peak voltage of the periodic power signal; (4) calculating the time period or otherwise identifying when the power converter is in a critical mode; (5) filtering harmonic noise from an output of the power converter; and/or (6) filtering noise from a current feedback signal. Each of these additional steps is generally performed as described above with respect to the corresponding hardware configured to conduct, practice or implement the step.

In certain implementations, the step of determining the peak voltage may comprise comparing a voltage of the periodic power signal to a first reference voltage, sampling an output of the comparing step to generate a plurality of power signal voltage samples, and determining a maximum power signal voltage sample value, the peak voltage corresponding to the maximum power signal voltage sample value. Also, the present method generally further comprises the step of applying a potential to the switch for a predetermined period of time when the power converter is in the critical mode.

Exemplary Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium or waveform comprises at least one instruction (or subset of instructions) to (a) count predetermined time units corresponding to (i) the power signal period and/or (ii) the length of time, in response to an indication of a zero voltage on the periodic power signal; (b) determine (e.g., compute or calculate) the peak voltage; and/or (c) determine and/or indicate (e.g., by calculating a corresponding time period) when the power converter is in the critical mode. In one implementation, the instruction(s) to determine the peak voltage comprise at least one subset of instructions to (i) sample an output of a comparison of the periodic power signal voltage to a reference voltage, (ii) store a plurality of power signal voltage samples, and (iii) determine a maximum power signal voltage sample value, the peak voltage corresponding to the maximum power signal voltage sample value.

CONCLUSION/SUMMARY

Thus, the present invention provides a circuit, system, method and software for controlling a power conversion and/or correcting and/or controlling a power factor in such conversion(s). The circuitry generally comprises a power factor controller, comprising (a) a circuit configured to determine and/or identify (i) a period of a periodic power signal and (ii) a length of time from a beginning of the period during which a potential is applied to a power conversion switch; (b) a voltage calculator configured to determine at least a peak voltage of the periodic power signal; and (c) logic configured to calculate a time period to open the switch in response to (i) the length of time, (ii) the power signal period, and (iii) the peak voltage. The system generally comprises the present controller and a switch that it controls, although the system aspect of the invention also relates to a power converter comprising the present controller, the switch, and an inductor configured to store energy from the periodic power signal.

The method generally comprises the steps of (1) storing energy from a periodic power signal in a power converter in response to application of a potential to switch in electrical communication with the power converter; (2) calculating a time period to open the switch from (i) an initial length of time during which a potential is applied to the switch, (ii) a period of the periodic power signal, and (iii) a peak voltage of the periodic power signal; and (3) opening the switch during the time period. The software generally comprises a set of instructions adapted to carry out the present method.

The present invention generally takes a computational approach to reducing and/or minimizing zero current periods in the critical mode of power converter operation, and advantageously reduces zero current periods in the critical mode to a reasonable and/or tolerable minimum, thereby maximizing the power factor of the power converter in the critical mode and reducing noise that may be injected back into AC power lines. The present power factor controller allows for greater design flexibility, reduced design complexity, and/or reduced resolution and/or greater tolerance for error in certain parameter measurements or samples.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A power factor controller, comprising:

a circuit configured to determine and/or identify a period of a periodic power signal and a length of time from a beginning of said period during which a potential is applied to a power conversion switch;

a voltage calculator configured to determine at least a peak voltage of said periodic power signal;

logic configured to calculate a time period to open said *power conversion* switch in response to said length of time, said period, and said peak voltage; and a voltage detector configured to determine a zero voltage at an input to a power converter operating on said periodic power signal.

2. The power factor controller of claim 1, further comprising a comparator configured to compare a voltage of said periodic power signal to a first reference voltage and provide a first relative voltage value to said voltage calculator.

3. The power factor controller of claim 2, wherein said comparator is configured to compare said voltage of said periodic power signal to a second reference voltage and provide a second relative voltage value to [a] *said* voltage detector configured to determine [a] *said* zero voltage at [an] *said* input to [a] *said* power converter operating on said periodic power signal.

4. The power factor controller of claim 3, further comprising first and second analog-to-digital converters respectively configured to receive a voltage feedback from an output of said power converter and a current feedback in electrical communication with said *power conversion* switch.

5. The power factor controller of claim 1, further comprising a digital-to-analog converter configured to receive an output from said logic and provide an analog input in communication with said *power conversion* switch.

6. The power factor controller of claim [5] *4*, further comprising a notch filter configured to receive an output from said first analog-to-digital converter and a second filter configured to receive an output from said second analog-to-digital converter.

7. The power factor controller of claim 1, wherein said periodic power signal comprises an alternating current power signal.

8. The power factor controller of claim 1, further comprising a first filter configured to reduce or remove harmonic noise from an output of said power converter in response to an output voltage feedback signal.

9. The power factor controller of claim 1, wherein said logic comprises a digital signal processor.

10. The power factor controller of claim 1, further comprising a filter configured to reduce or remove noise from a current feedback signal.

11. A power factor controller, comprising:

a circuit configured to determine and/or identify a period of a periodic power signal and a length of time from a beginning of said period during which a potential is applied to a power conversion switch;

a voltage calculator configured to determine at least a value of [the] *a* peak voltage of said periodic power signal;

logic configured to calculate a time period to open said *power conversion* switch in response to said length of time, said [power signal] period, and said value of the peak voltage; *and* a comparator configured to compare a voltage of said periodic power signal to a first reference voltage and provide a first relative voltage value to said voltage calculator.

12. The power factor controller of claim 11, further comprising a digital-to-analog converter configured to receive an output from said logic and provide an analog input in communication with said *power conversion* switch.

13. The power factor controller of claim 12, further comprising first and second analog-to-digital converters respectively configured to receive a voltage feedback from an output of [said] *a* power converter and a current feedback in electrical communication with said *power conversion* switch.

14. The power factor controller of claim 13, further comprising a notch filter configured to receive an output from said first analog-to-digital converter and a second filter configured to receive an output from said second analog-to-digital converter.

15. A power factor controller, comprising:

a circuit configured to determine and/or identify a period of a periodic power signal and a length of time from a beginning of said period during which a potential is applied to a power conversion switch;

a voltage calculator configured to determine at least a value of [the] *a* peak voltage of said periodic power signal;

logic configured to calculate a time period to open said *power conversion* switch in response to said length of time, said [power signal] period, and said value of the peak voltage; and a digital-to-analog converter configured to receive an output from said logic and provide an analog input in communication with said *power conversion* switch.

16. The power factor controller of claim 15, further comprising first and second analog-to-digital converters respectively configured to receive a voltage feedback from an output of [said] *a* power converter and a current feedback in electrical communication with said *power conversion* switch.

17. The power factor controller of claim 16, further comprising a notch filter configured to receive an output from said first analog-to-digital converter and a second filter configured to receive an output from said second analog-to-digital converter.

18. A method of controlling a power converter, the method comprising:

storing energy from a periodic power signal in said power converter in response to application of a potential to a switch in electrical communication with said power converter;

determining a period of said periodic power signal and a length of time from a beginning of said period during which said potential is applied to said switch;

determining a peak voltage of said periodic *power* signal;

calculating a time period to open said switch from said length of time, said period, and said peak voltage; and opening said switch during said time period.

19. The method of claim 18, wherein determining said peak voltage comprises comparing a voltage of said periodic power signal to a first reference voltage, sampling an output of said comparing step to generate a plurality of power signal voltage samples, and determining a maximum power signal voltage sample value, wherein said peak voltage corresponds to said maximum power signal voltage sample value.

20. The method of claim 19, further comprising timing said [power signal] period and/or said length of time in response to a zero voltage indication.

21. The method of claim 18, further comprising determining a zero voltage at an input to said power converter.

22. The method of claim 18, wherein said periodic power signal comprises an alternating current power signal.

23. The method of claim 18, further comprising calculating said time period when said power converter is in a critical mode.

24. The method of claim 18, further comprising filtering harmonic noise from an output of said power converter and a current feedback signal.

* * * * *